United States Patent [19]

Mueller et al.

[11] Patent Number: 4,467,445
[45] Date of Patent: Aug. 21, 1984

[54] COMMUNICATION ADAPTER CIRCUIT

[75] Inventors: Mark W. Mueller; Thomas S. Parker, both of Cedar Park; Douglas M. Benignus; James L. Frye, both of Round Rock, all of Tex.

[73] Assignee: International Business Machines Corporation, Armonk, N.Y.

[21] Appl. No.: 274,300

[22] Filed: Jun. 16, 1981

[51] Int. Cl.$^3$ .......................... G06F 3/00; G06C 9/00
[52] U.S. Cl. .................................................. 364/900
[58] Field of Search .................. 370/15; 364/200, 900

[56] References Cited

U.S. PATENT DOCUMENTS

| Re. 27,864 | 1/1974 | Davis | 370/15 |
|---|---|---|---|
| 3,359,543 | 12/1967 | Corr | 370/24 |
| 3,510,843 | 5/1970 | Bennett | 364/200 |
| 3,569,943 | 3/1971 | Mackie | 364/200 |
| 3,585,599 | 6/1971 | Hitt | 364/200 |
| 3,601,794 | 8/1971 | Blomenkamp | 340/669 |
| 3,676,858 | 7/1972 | Finch et al. | 364/200 |
| 3,714,635 | 1/1973 | Hamilton | 364/200 |
| 3,750,107 | 7/1973 | Pyne | 364/200 |
| 3,833,892 | 9/1974 | Marsalka | 364/900 |
| 3,975,712 | 8/1976 | Hepworth | 371/49 |
| 4,039,956 | 8/1977 | Shimanek | 340/722 |
| 4,070,562 | 1/1978 | Kuno | 340/669 |
| 4,336,497 | 6/1982 | Woodhouse | 340/669 |

FOREIGN PATENT DOCUMENTS 19757 10/1980 European Pat. Off. .

OTHER PUBLICATIONS

Proceedings of the National Electronics Conference, vol. 31, 1977, pp. 300-304, G. J. Summers, "Microprocessor Controlled LSI in Data Communication Links."
Electronic Engineering, vol. 52, No. 642, Sep. 1980, pp. 111, 113, 117, 119 and 122, G. P. Sawyer et al., "New Concepts in Single Board Computers."
E.D.N. vol. 23, No. 1, Jan. 1978, pp. 61-67, A. Hirsch, "Minis Used as Data Interfaces Merit Multi-Level Considerations."
Intel-MCS-80/85 TM Family Users' Manual, Oct. 1979.
Krutz, "Microprocessors and Logic Design", 1980, John Wiley & Sons, Section 8.1-8.5.
Electronics, Sep. 1977, Qugle, "Using Bar Meter Displays Lowers Panel Meter Costs."

Primary Examiner—Felix D. Gruber
Assistant Examiner—Ronni S. Malamud
Attorney, Agent, or Firm—Harold E. Meier

[57] ABSTRACT

A communication adapter circuit (10) is connected to a processor through a data bus (12) and a control bus (14). Data and control signals are provided through the buses (12,14) to a timer circuit (18), a programmable peripheral interface circuit (20), an asynchronous and bisynchronous control circuit (22) and an SDLC/HDLC control circuit (24). Each of the control circuits (22, 24) includes parallel-to-serial and serial-to-parallel conversion circuitry. A clock select circuit (32) operates in conjunction with the timer circuit (18) and the programmable peripheral interface circuit (20) to establish a data transmission rate for the data flow through the adapter circuit (10). From the control circuits (22, 24) the data is transmitted through a bi-directional serial line (44) to a dual modem switch (56). From the switch (56) the data is transmitted to either an EIA interface circuit (60) to a conventional modem or through a line (64) to an internal modem.

8 Claims, 17 Drawing Figures

COMMUNICATION ADAPTER CIRCUIT

DESCRIPTION

RELATED APPLICATION

Copending application entitled "Bisynchronous Protocol Communication Circuit", filed June 16, 1981, Ser. No. 274,296, now U.S. Pat. No. 4,445,193, to Mueller et al is directed to subject matter related to this application.

BACKGROUND OF THE INVENTION

1. Field of the Invention

The present invention pertains to data communications and in particular to a communication interface which processes any one of a plurality of communication protocols.

2. Description of Prior Art

Digital data communication between remote terminals is coming into widespread use especially for office and business communications. This communication is typically transmitted through telephone lines or equivalent narrow band communication channels. Each of the terminals involved in the communication usually utilizes a modem for transmission of the digital data over the communication channel. However, in the development of data communications a number of separate and incompatible communication protocols have been adopted. A terminal which is designed to operate with one protocol is limited to communicating only with other terminals which utilize the same protocol. The existence of the multiple and incompatible protocols constitutes a serious impediment to the expansion of business and commercial data communications.

It appears that each of the major communications protocols will continue in use for an extended period of time. Therefore there exists a need for an adapter circuit for use in conjunction with a processor in a terminal to provide communications with other terminals which utilize any of the various protocols.

SUMMARY OF THE INVENTION

A selected embodiment of the present invention comprises a multi-protocol communication adapter circuit for interfacing a processor with a modem for providing communication between the processor and a remote terminal. The adapter circuit includes a processor I/O interface which comprises a data transfer bus connected to the processor and a plurality of control lines also connected to the processor. The adapter circuit includes an asynchronous and bisynchronous control circuit which is connected to the data transfer bus and to the modem for controlling data transfer between the processor and the remote terminal under asynchronous and bisynchronous protocols. The asynchronous and bisynchronous control circuit is also connected to at least one of the control lines for receiving command signals from the processor. An SDLC (Synchronous Data Line Control) control circuit is connected to the data transfer bus and to the modem for controlling data transfer between the processor and the remote terminal under an SDLC protocol. The SDLC control circuit is connected to at least one of the control lines for receiving command signals from the processor. The adapter circuit further includes a clock selection circuit which is connected to receive command signals from the processor through at least one of the control lines and is connected to the synchronous and bisynchronous control circuit and to the SDLC control circuit for providing a selectable rate clock signal to the asynchronous and bisynchronous control circuit and to the SDLC control circuit for setting the rate of data transfer between the processor and the remote terminal.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
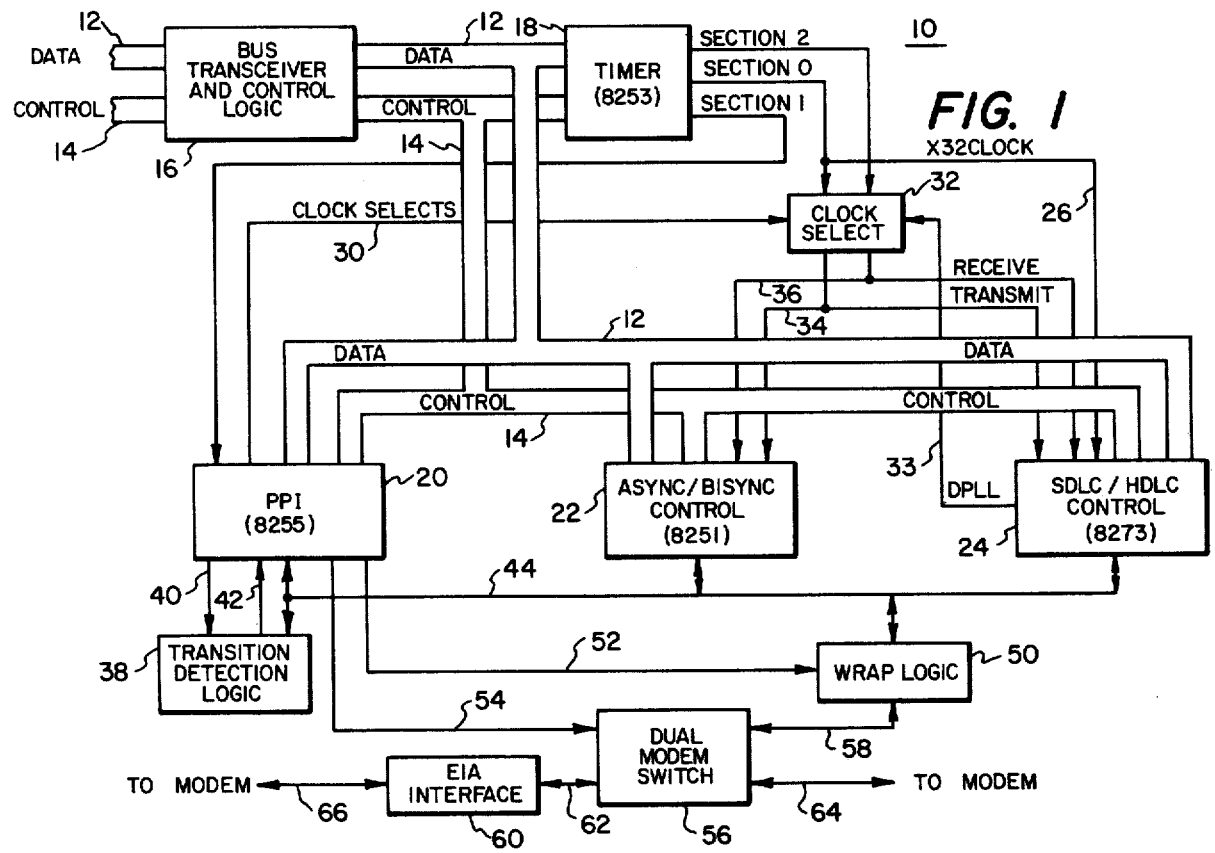
FIG. 1 is a functional block diagram of the communication adapter circuit of the present invention.

Referring now to FIG. 1 a multi-protocol communication adapter circuit 10 is shown as a functional block diagram. A work station, such as a word processing unit, includes a processor that carries out the function of the work station. The adapter circuit 10 is designed to interface with the processor (not shown) such that the word processing work station can be used for direct communications with a remote terminal, such as another word processing work station.

The processor in the work station is connected to buses 12 and 14 which comprise a processor I/O interface. Bus 12 is primarily for data and bus 14 is primarily for control. The buses will be referred to as a processor I/O interface. These buses comprise a plurality of lines which transfer command signals and other signals between the various units of the adapter circuit 10 and the processor in the work station.

A bus transceiver and control logic circuit 16 is connected to the processor I/O interface buses 12 and 14. The logic circuit 16 serves to properly route and control the signals transmitted through the buses.

The processor I/O interface buses 12 and 14 are connected to a plurality of functional circuits including a timer circuit 18, a programmable peripheral interface (PPI) circuit 20, an asynchronous and bisynchronous control circuit 22 and an SDLC/HDLC control circuit 24. The timer circuit 18 is preferably a type 8253, the PPI circuit 20 is a type 8255, the asynchronous and bisynchronous control circuit 22 is a type 8251 and the SDLC/HDLC control circuit 24 is a type 8273. Each of these four types of LSI circuits is manufactured by Intel Corporation.

The PPI circuit 20 generates a clock select command signal which is transmitted through line 30 to a clock select circuit 32. Line 30 in the illustrated embodiment comprises two discrete lines.

A clock signal at a rate which is a multiple of the data transfer rate is transmitted through a line 26 from the timer circuit 18 to the control circuit 24. The control circuit 24 includes a digital phase locked loop which receives the clock signal from line 26 and generates a data clock signal which is transmitted through a line 33 to the clock select circuit 32.

The timer circuit 18 has three internal sections. Sections 0 and 2 are connected to the clock select circuit 32. Section 1 is connected to the PPI circuit 20.

The clock select circuit 32 carries transmit and receive clock signals respectively on lines 34 and 36. These transmit and receive clock signals are input to both the asychronous and bisynchronous control circuit 22 and the SDLC control circuit 24.

A transition detector logic circuit 38 is connected through lines 40 and 42 to the PPI circuit 20. Circuit 38 serves to detect state transitions for the signals and commands transmitted through the adapter circuit 10 over a modem interface bus 44.

The bus 44 is connected to the PPI circuit 20, the asynchronous and bisynchronous control circuit 22, the SDLC control circuit 24 and the transition detector logic circuit 38. The data transfer between the processor and the remote terminal is transmitted in parallel fashion through the processor I/O interface bus 12 and in serial fashion through the bus 44.

A wrap logic circuit 50 is also connected to the bus 44. The PPI circuit 20 provides a command signal through a line 52 to the wrap logic circuit 50. The PPI circuit 20 further provides a command signal through a line 54 to a dual modem switch 56. The wrap logic circuit 50 is connected through a modem interface bus 58 to the switch 56.

An EIA (Electronic Industry Association) RS 232 interface circuit 60 is connected through a bus 62 to the switch 56. A bus 64 is connected between a modem (not shown) and the modem switch 56. A bus 66 is connected between a modem (not shown) and an EIA interface circuit 60.

A detailed schematic diagram of the communication adapter circuit 10 is shown in the FIGS. 2–16. Each of the terminals shown in the FIGS. 2–16 is given a specific designation. The terminals having the same designations are connected in common to form the complete circuit. The terminals shown with terminal pads, such as pad 72 shown in FIG. 2, form connectors on the circuit card which carries the communication adapter circuit 10.

Figure 2:
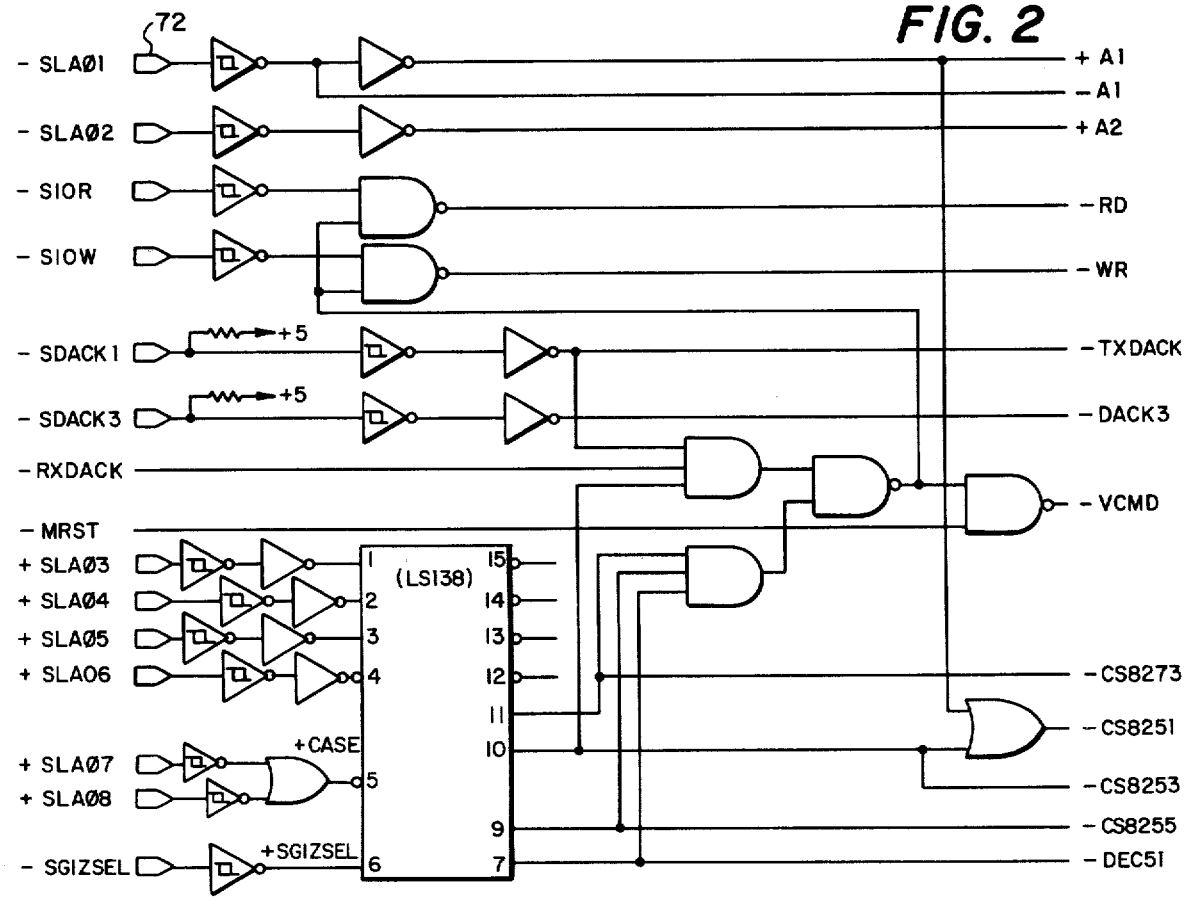
FIGS. 2, 3 and 4 are detailed schematic logic diagrams of the bus transceiver and control logic circuit 16 shown in FIG. 1.
Figure 3:
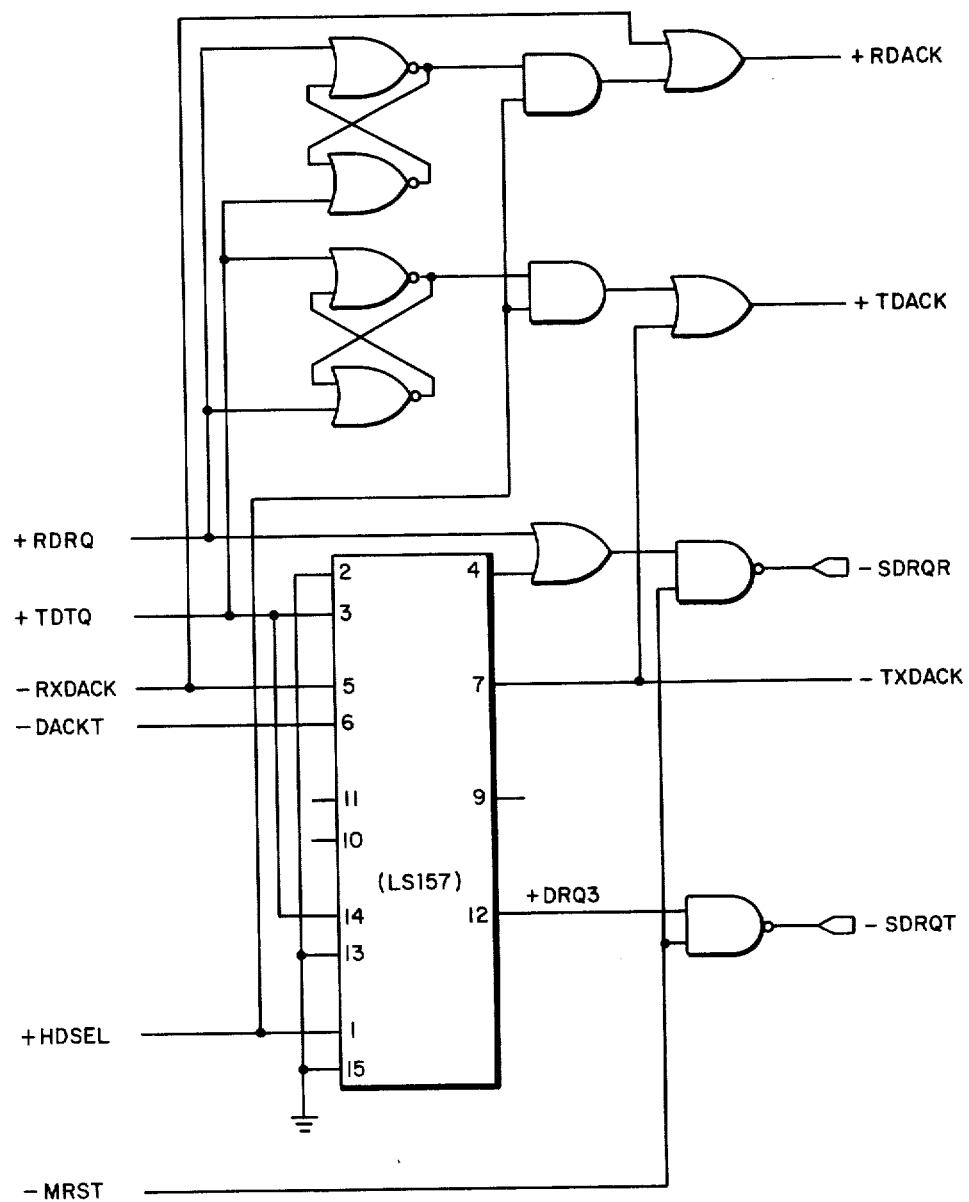
Figure 4:
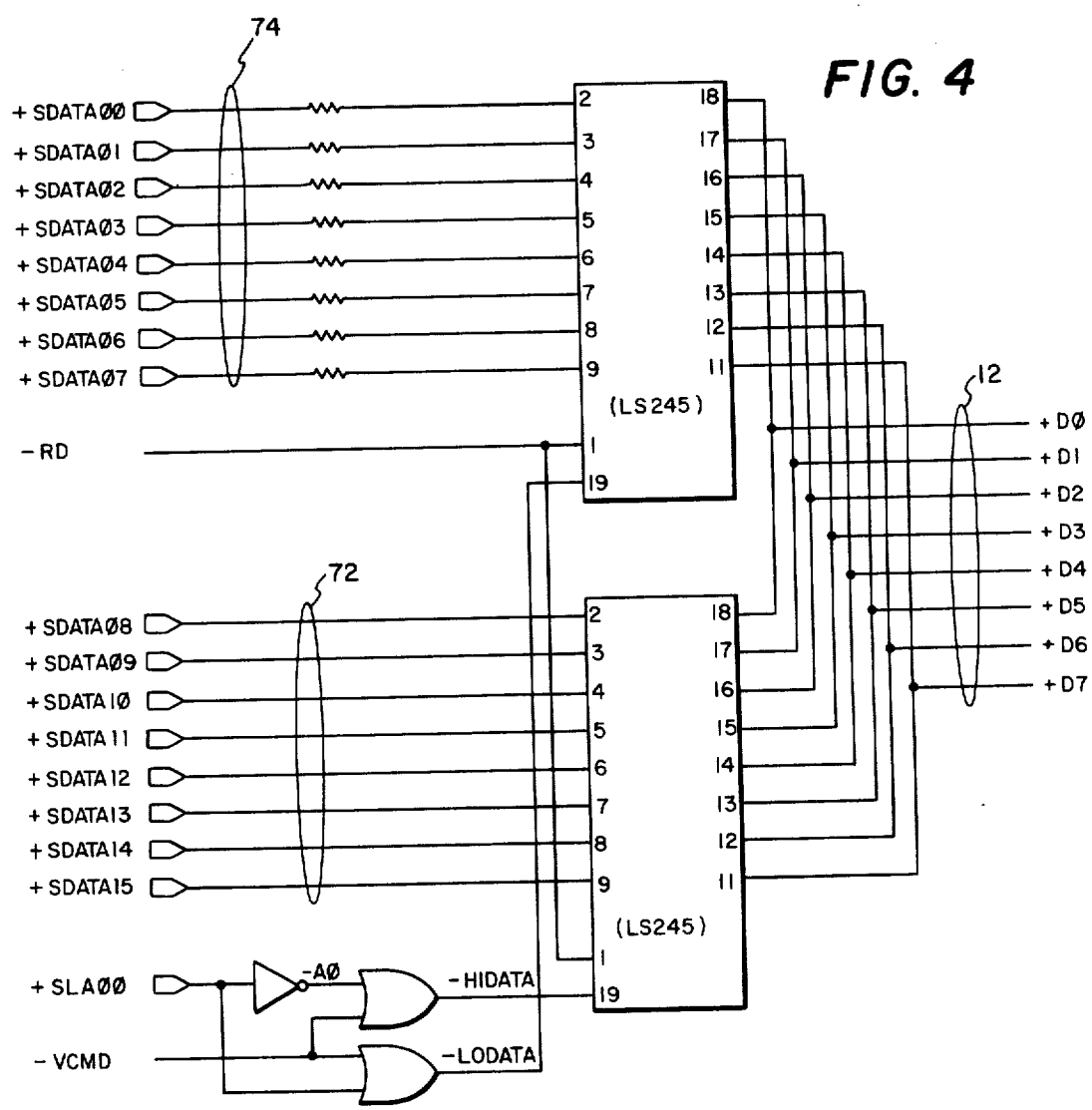

The bus transceiver and control logic circuit 16 is shown in detail in FIGS. 2, 3 and 4. In FIGS. 2 and 4 the connector terminals which have the initial letter "S" are connections to the processor of the work station. Referring specifically to FIG. 4 the lines 74 and 76 are input data lines from the processor (not shown). The lines 74 and 76 comprise a 16 bit wide portion of the data bus 12.

The remainder of the data bus 12 in circuit 10 is 8 bits wide and comprises the lines D∅ through D7.

Figure 5:
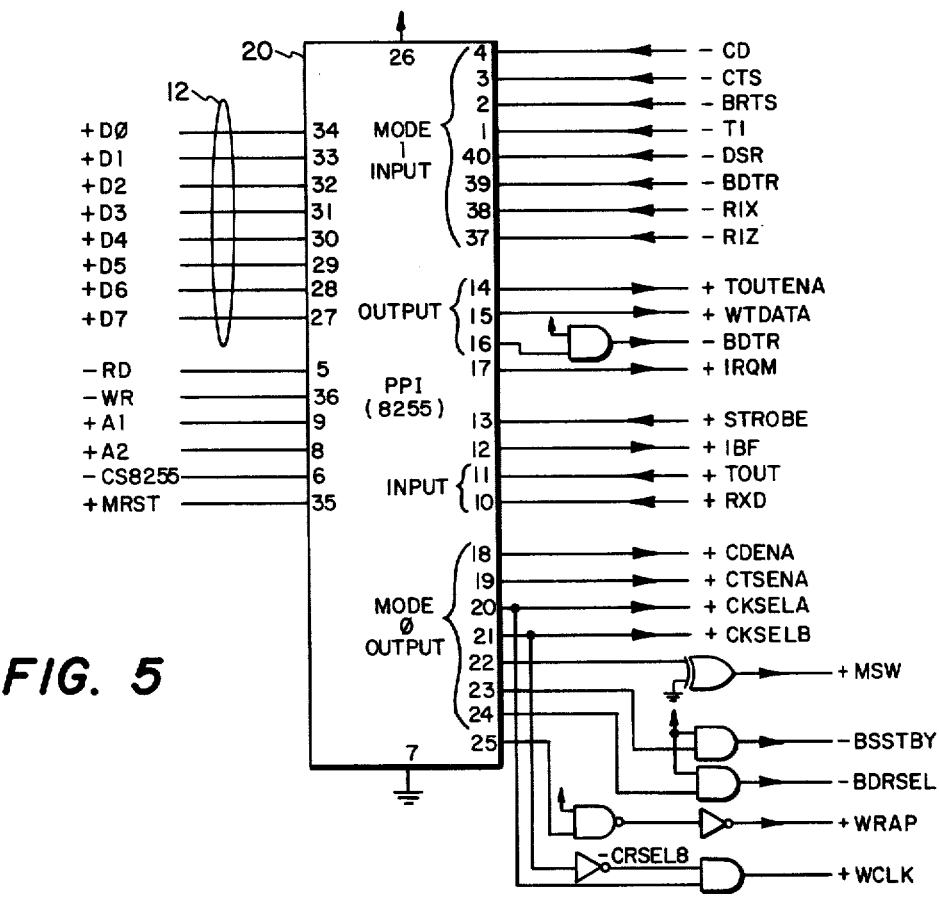
FIG. 5 is a detailed diagram of the programmable peripheral interface circuit (8255) shown in FIG. 1.

FIG. 5 illustrates the detailed pin connections for the PPI circuit 20.

Figure 6:
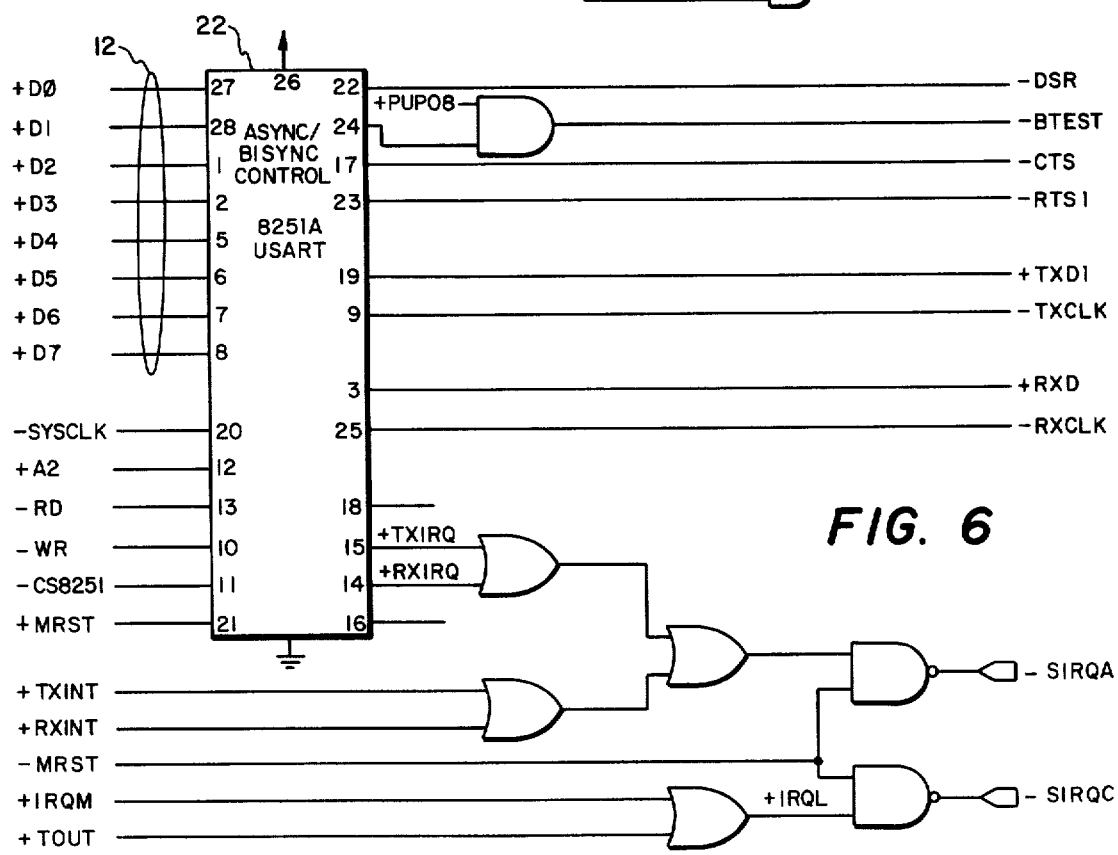
FIG. 6 is a detailed diagram of the asynchronous and the bisynchronous control circuit (8251) shown in FIG. 1.

FIG. 6 shows the detailed pin connections and associated logic for the asynchronous and bisynchronous control circuit 22. Control circuit 22 is further referred to as a USART (Universal Synchronous Asynchronous Receiver Transmitter).

Figure 7:
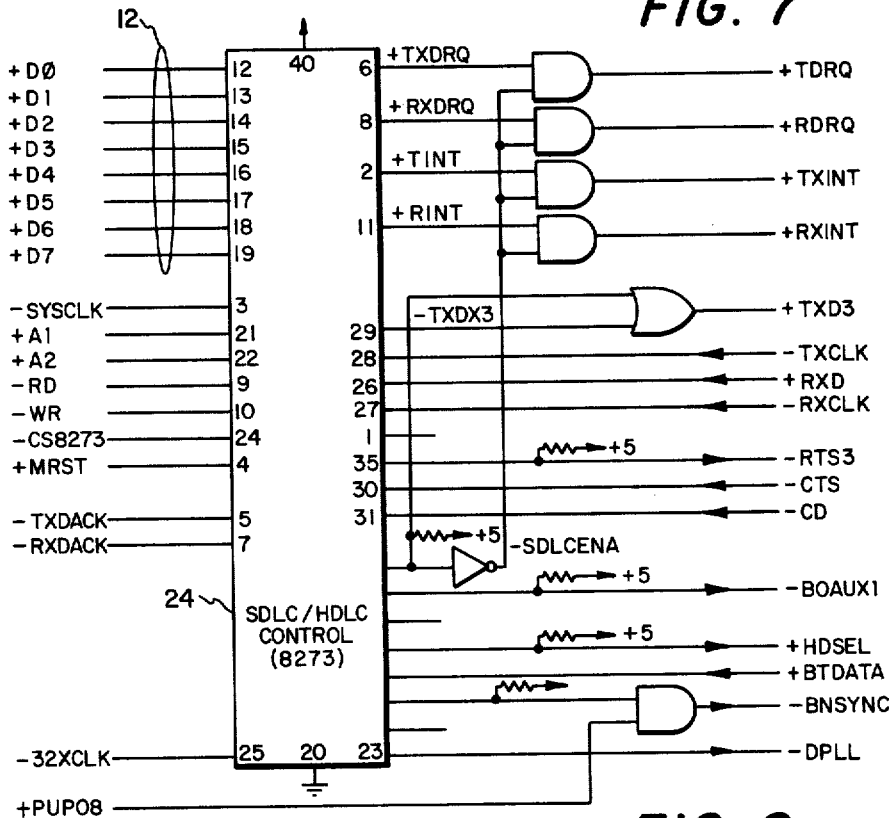
FIG. 7 is a detailed diagram of the SDLC control circuit (8273) shown in FIG. 1.

FIG. 7 is a detailed presentation of the pin connections and associated logic for the SDLC/HDLC control circuit 24.

Figure 8:
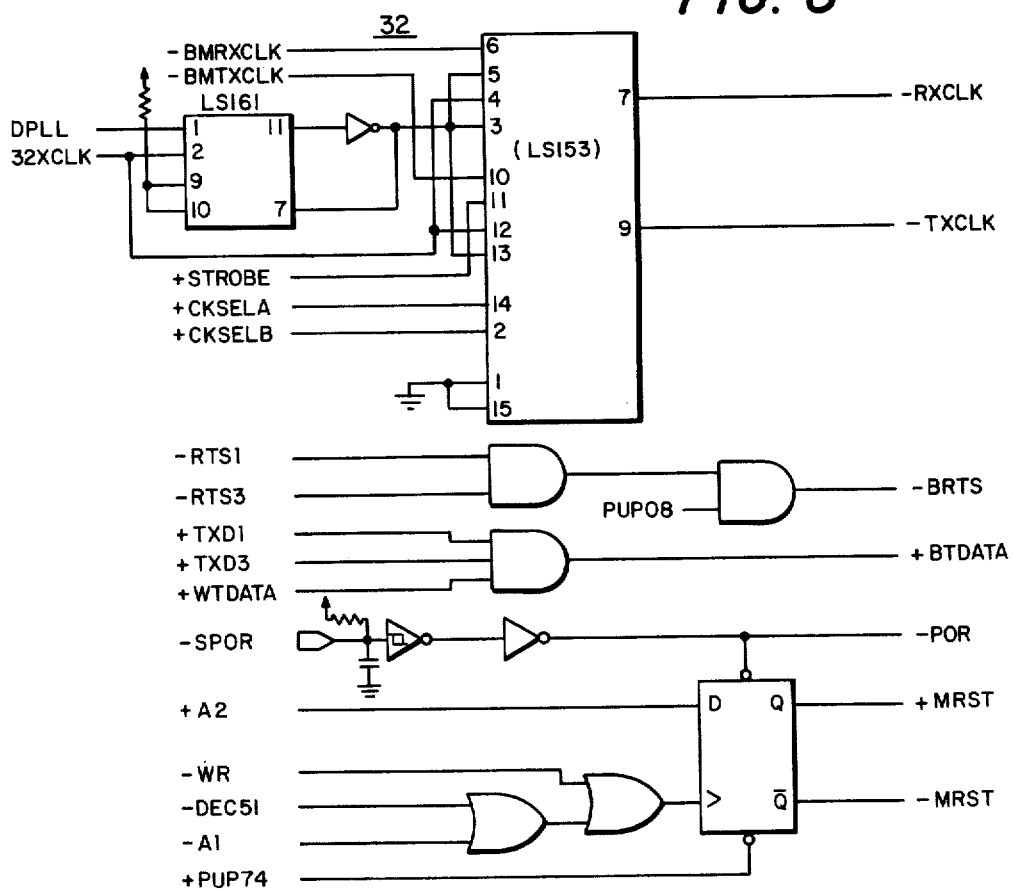
FIG. 8 is a detailed schematic diagram of the clock select circuit 32 shown in FIG. 1.

FIG. 8 is a detailed schematic illustration of the clock select logic circuit 32 shown in FIG. 1.

Figure 9:
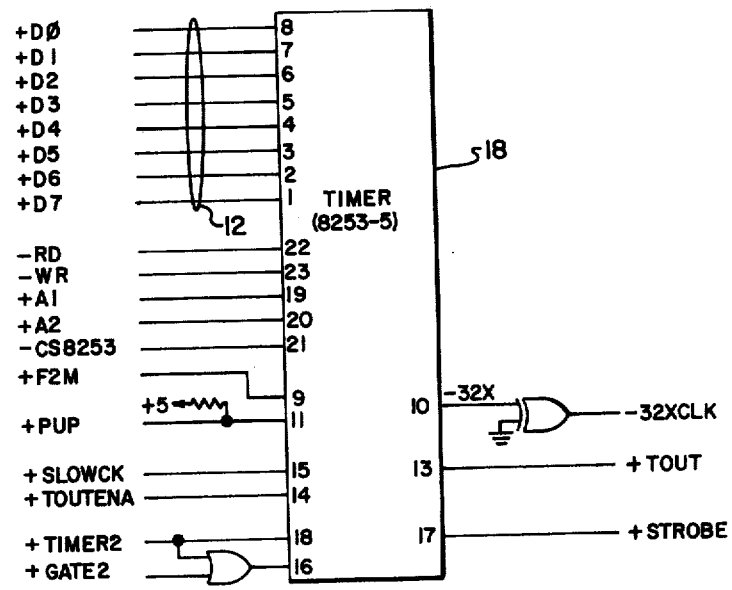
FIG. 9 is a detailed diagram of the timer circuit (8253) shown in FIG. 1.

FIG. 9 is a detailed pin connection illustration for the timer circuit 18 shown in FIG. 1.

Figure 10:
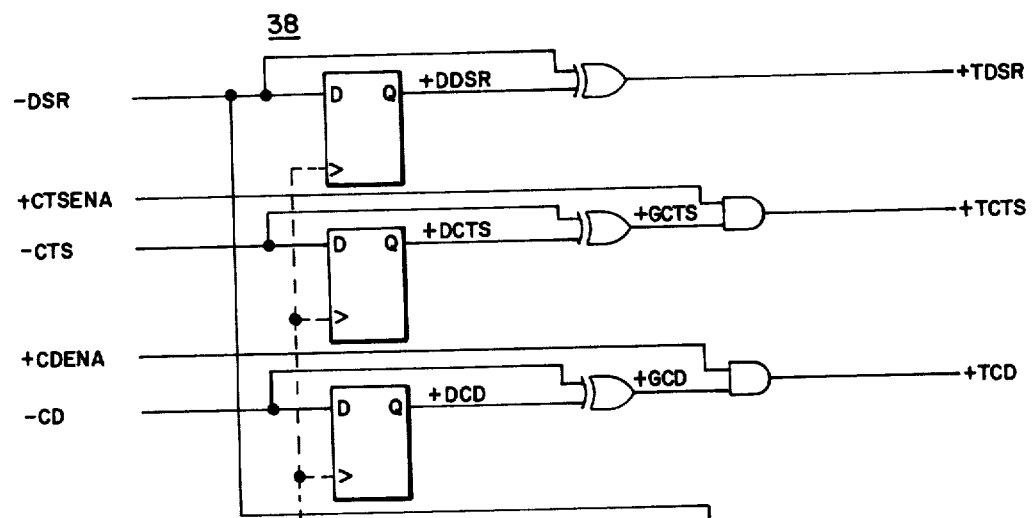
FIG. 10 is a detailed schematic diagram of the transition detector logic circuit 38 shown in FIG. 1.
Figure 10:
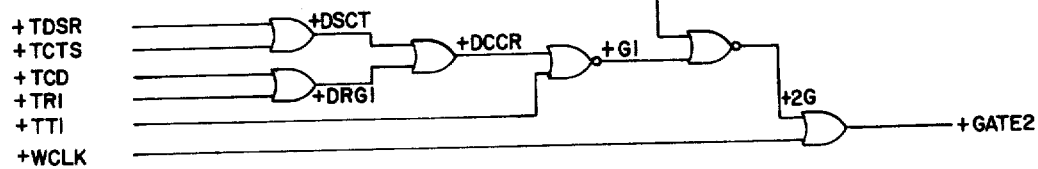

The transition detector logic circuit 38 is illustrated in the detailed logic diagram in FIG. 10.

Figures 11, 12:
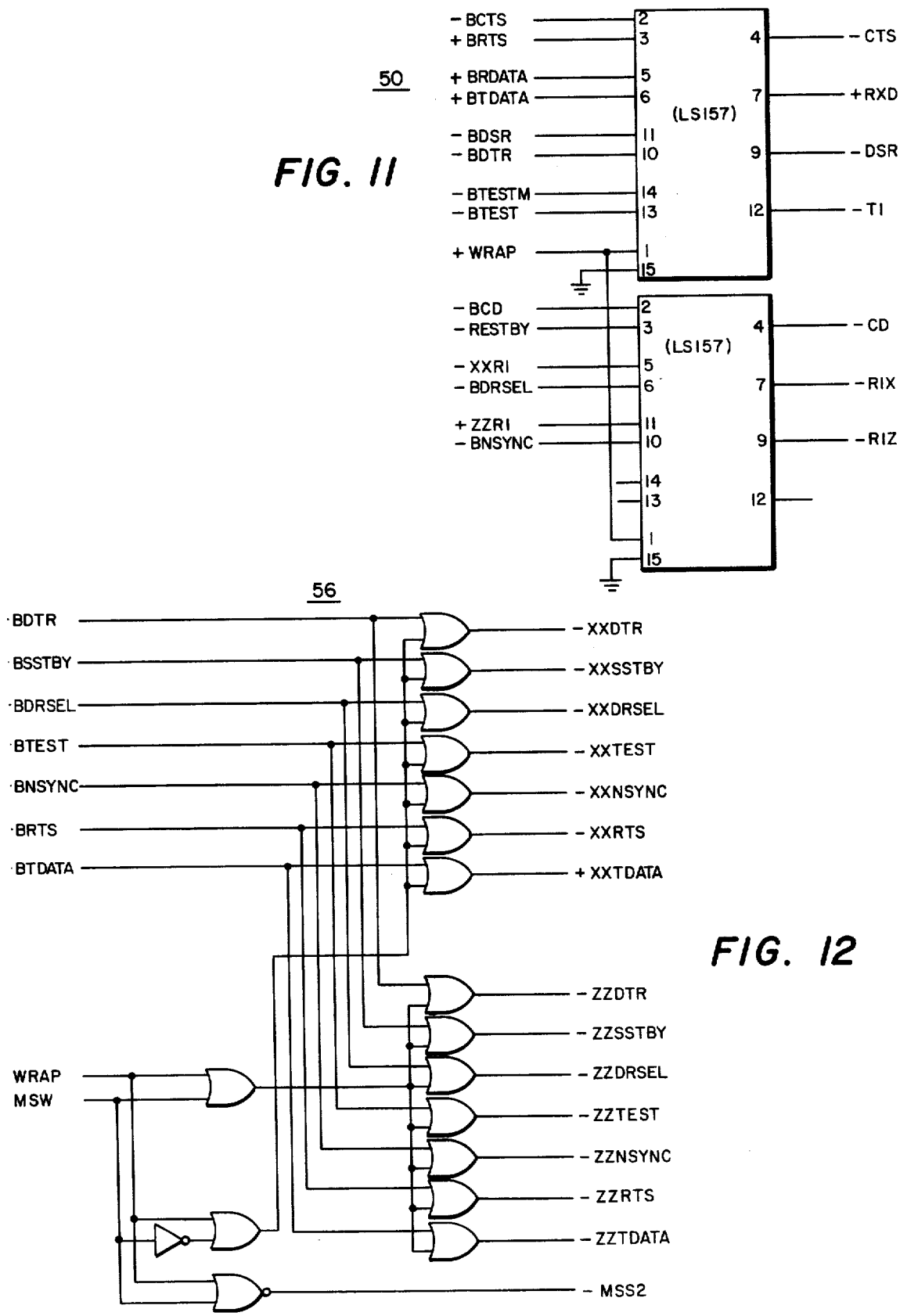
FIG. 11 is a schematic diagram of the wrap logic circuit 50 shown in FIG. 1.
FIGS. 12 and 13 are schematic diagrams of the dual modem switch 56 shown in FIG. 1.

The wrap logic circuit 50 shown in FIG. 1 is illustrated in a detailed schematic in FIG. 11.

Figure 13:
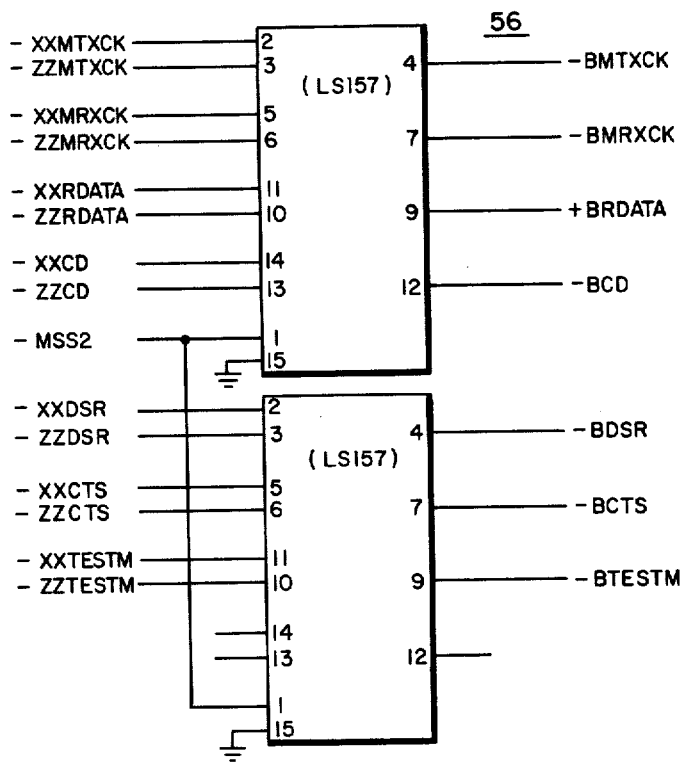

The dual modem switch 56 is shown as a detailed schematic illustration in FIGS. 12 and 13.

Figure 14:
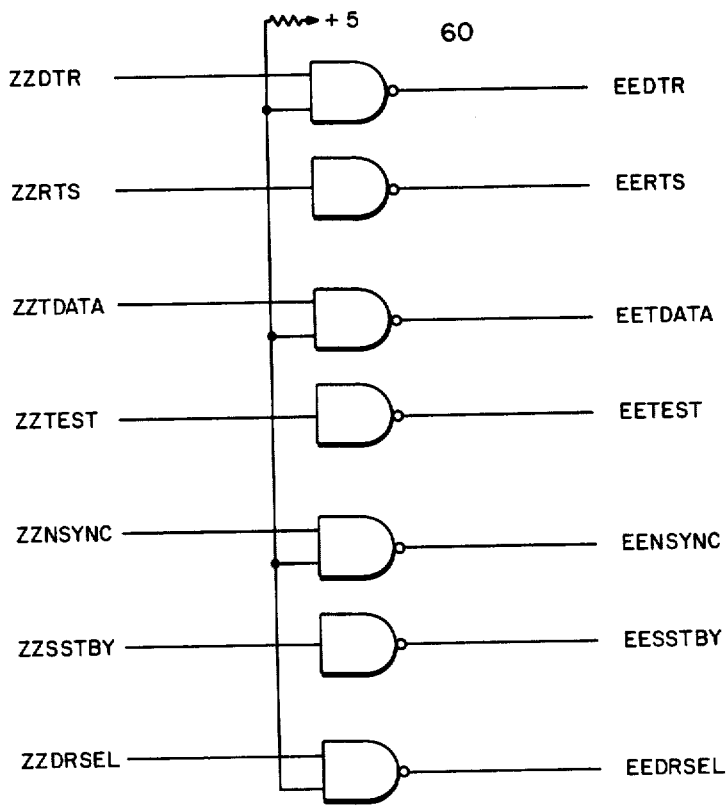
FIGS. 14 and 15 are schematic diagrams of the EIA interface 60 shown in FIG. 1.
Figure 15:
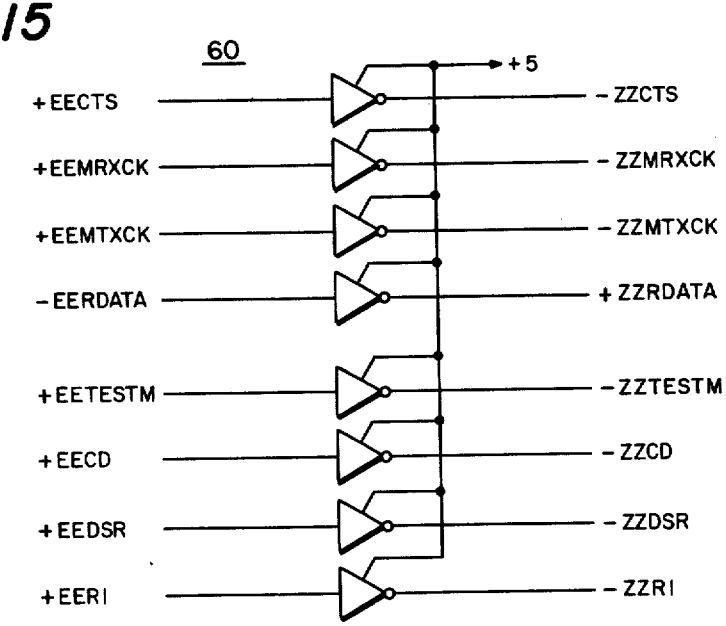
Figure 16:
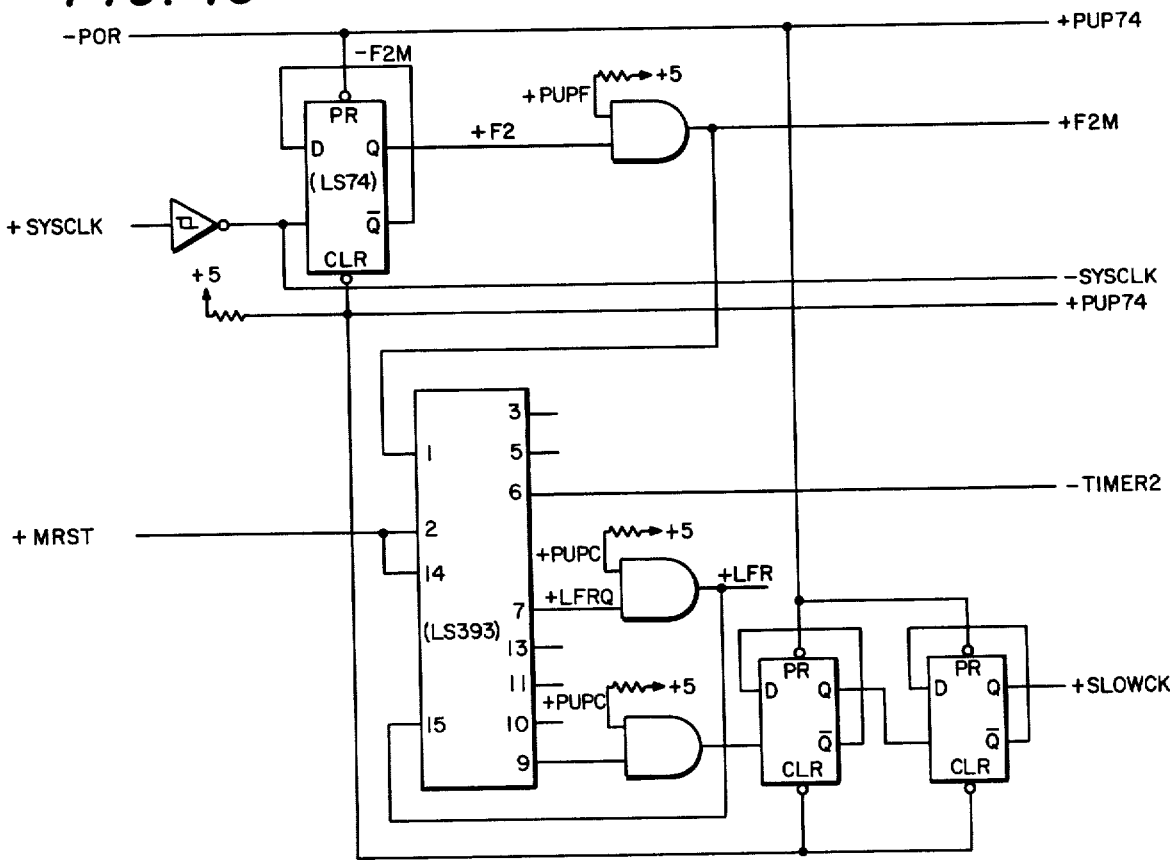
FIG. 16 is a schematic logic diagram of general timing circuitry utilized in the circuit of FIG. 1.

The EIA interface circuit 60 is shown in a detailed schematic illustration in FIGS. 14 and 15.

The adapter circuit 10 requires selected timing signals between varius components of the circuit. These timing signals are generated by a timing circuit 80 which is shown in detailed schematic form in FIG. 16.

Figure 17:
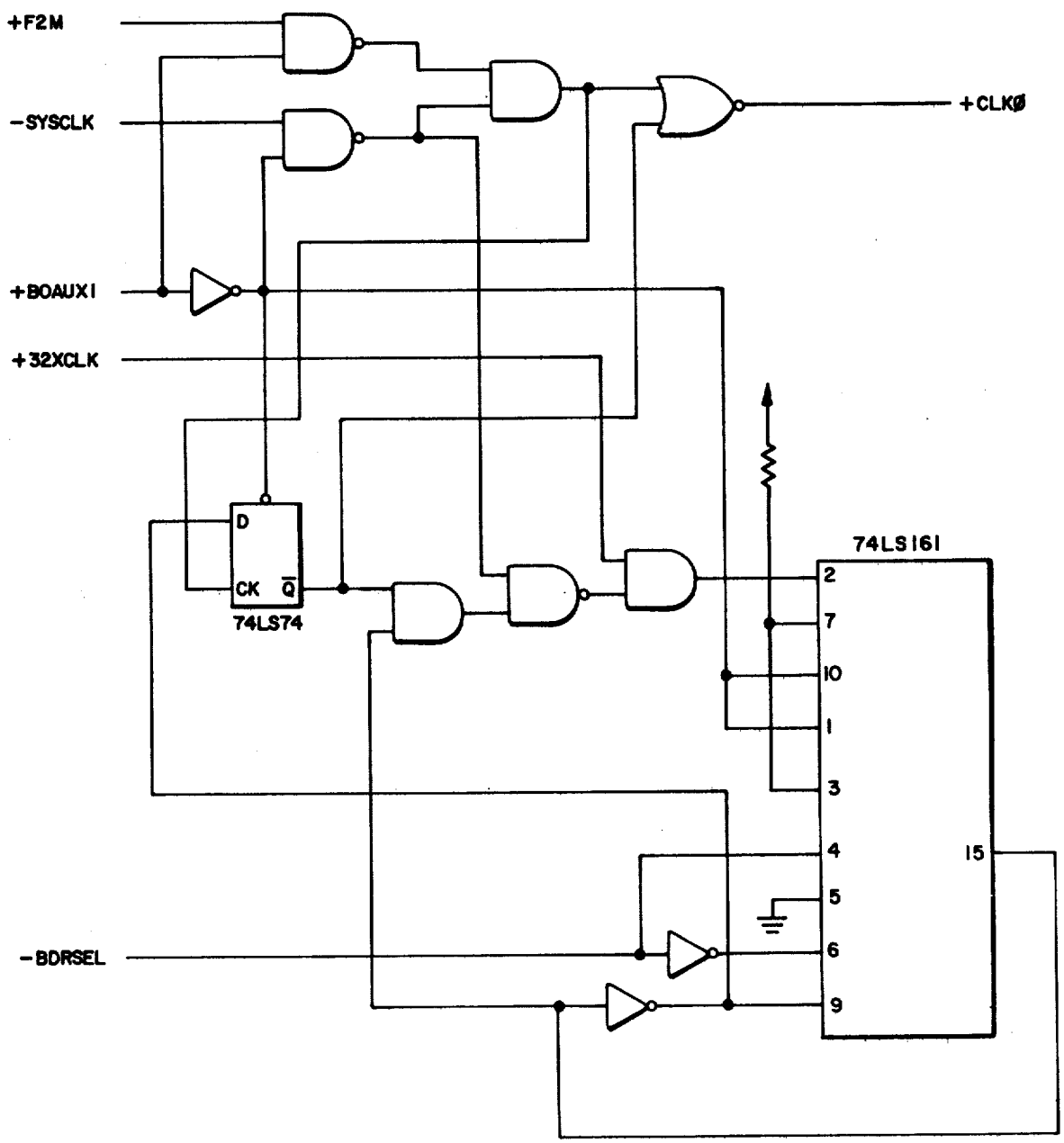
FIG. 17 is a schematic logic diagram of division circuitry which operates in conjunction with the timer circuit (8253) shown in FIG. 1.

FIG. 17 is a detailed logic diagram of circuitry which operates in conjunction with the timer circuit 18 to provide division of a clock signal by a fractional number.

The types and functions of the various logic circuits shown in FIGS. 2–16 are given in Table 1. In the FIGURES the initial "74" is omitted for the logic circuits.

TABLE 1

| PART NAME | DESCRIPTION |
|---|---|
| 74LS00 | Quad - Dual Input NAND |
| 74LS02 | Quad - Dual Input NOR |
| 74LS04 | Hex - Inverter |
| 74LS08 | Quad - Dual Input AND |
| 74LS11 | Tri - 3 Input AND |
| 74LS32 | Quad - Dual Input OR |
| 74LS74 | Dual - D-Type FF |
| 74LS86 | Quad - Dual Input XOR |
| 74LS138 | 3 to 8 Decoder |
| 74LS153 | Dual 4-1 Demultiplexor |
| 74LS157 | Quad 2-1 Demultiplexor |
| 74LS161 | Four Bit Binary Counter |
| 74LS174 | Hex - D-Type FF |
| 74LS245 | Octal Bus Transceiver |
| 74LS393 | Dual 4-Bit Binary Counter |
| 7414 | Hex-Inverting Schmidt Trig. |
| 75150 | Dual EIA Driver |
| 75154 | Quad - EIA Receive |
| 8251A | USART |
| 8253-5 | Prog. Timer |
| 8255A-5 | PPI |
| 8273 | HDLC/SDLC |

The operation of the multi-protocol communication adapter circuit of the present invention is now described in reference to FIG. 1. To set up a communication path with a remote terminal the processor (not shown) transmits command signals through the processor I/O interface buses 12 and 14 to set up one of the desired communication protocols. The available protocols in this embodiment are asynchronous, bisynchronous and SDLC. These protocols are well defined in the communication industry. In the asynchronous protocol no clock signals are transferred between the control circuit and modem, but in the bisynchronous and SDLC protocols clock signals may or may not be provided between the control circuits and the modem. The control commands from the processor are sent to the timer circuit 18, PPI circuit 20, asynchronous and bisynchronous control circuit 22 and the SDLC circuit 24. The command sent to the timer circuit 18 and the PPI circuit 20 selects the clock rate that will govern the transmission of data through the communication path being established. The clock select circuit receives timing signals from the timer circuit 18, through the DPLL line 33 from the SDLC control circuit 24 or from a modem. The selected clock signals are then transmitted to the asynchronous and bisynchronous control circuit 22 and the SDLC control circuit 24. The processor transmits data to the one of the circuits 22 or 24 which is selected by the processor prior to the actual communication process.

After the adapter circuit 10 is initialized to operate in a selected protocol with a selected clock rate, data is transferred over the processor I/O interface bus 12 and a serial line in bus 44. Each of the circuits 22 and 24 has serial-to-parallel and parallel-to-serial data conversion. The data is transmitted on the data bus 12 in parallel format and the data is transmitted over a line in bus 44 in serial format.

The transition detection logic circuit 38 monitors the state of the control lines in bus 44 and detects state changes which require operative responses by the processor. These responses deal with the operational control of the data flow.

The wrap logic circuit 50 provides a test function by transferring data on the transmit part of bus 44 to the receive part of bus 44 for return to the circuits 22 and 24. This enables the control circuits 22 and 24 together with the processor to check the operation of the circuits by comparing the transmitted data to the received data. When the wrap logic circuit 50 is not in a test mode it provides a direct transmission path between the bus 44 and the bus 58 to the dual modem switch 56.

The SDLC control circuit 24 includes a digital phase locked loop (DPLL) which monitors the receive data stream from bus 44 and produces a phase locked data clock signal which is transmitted through line 33. This clock signal is input to the clock select circuit 32 and is utilized by the control circuit 22 when it is operating with the bisynchronous protocol.

The dual modem switch 56 selectively routes the data which is transmitted through bus 58 to either the EIA interface circuit 60 or to an internal modem connected to line 64.

The EIA interface circuit 60 converts the TTL levels from bus 62 into the voltage levels defined by the EIA RS 232 interface standard.

In summary the present invention comprises a communications adapter circuit for interfacing a processor with a modem to provide communications between the processor and a remote terminal. The communications adapter circuit is set up by the processor to operate in any one of a plurality of communication protocols. The processor can establish the data transmission rate for communication between the processor and the remote terminal if not provided by the modem.

Although one embodiment of the invention has been illustrated in the accompanying drawings and described in the foregoing detailed description, it will be understood that the invention is not limited to the embodiment disclosed, but is capable of numerous rearrangements, modifications, and substitutions without departing from the scope of the invention.

We claim:

1. A multi-protocol communication adapter circuit for interfacing a processor with a modem for providing communication between the processor and a remote terminal, comprising:

a data transfer bus connected to said processor;

a plurality of control lines connected to said processor;

an asynchronous and bisynchronous control circuit connected to said data transfer bus and to said modem for controlling data transfer between said processor and said remote terminal under asynchronous and bisynchronous protocols, respectively, said asynchronous and bisynchronous control circuit connected to at least one of said control lines for receiving command signals from said processor;

an SDLC (Synchronous Data Line Control) control circuit connected to said data transfer bus and to said modem for controlling data transfer between said processor and said remote terminal under SDLC protocol, said SDLC control circuit connected to at least one of said control lines for receiving command signals from said processor, and having a clock recovery mechanism for generating a data clock signal;

means responsive to command signals from said processor for generating a clock select command signal representing the rate of data transfer between said processor and said remote terminal; and a clock selection circuit connected to said SDLC control circuit to receive said data clock signal, and to said means for generating to receive a clock select command signal, said clock selection circuit also connected to said asynchronous and bisynchronous control circuit for providing said data clock signal thereto during operation under said bisynchronous protocol, and for providing said data clock signal to said SDLC control circuit during operation under SDLC protocol.

2. The circuit recited in claim 1 for interfacing the processor to one of two modems further comprising a dual modem switch connected to said asychronous and bisynchronous control circuit and said SDLC control circuit for selectively connecting said control circuits to either one of the two modems.

3. The circuit recited in claim 1 including a wrap logic circuit connected to the modem, said asynchronous and bisynchronous control circuit and said SDLC control circuit for selectively routing test data between said control circuits for testing the operation of said communication adapter circuit.

4. The circuit recited in claim 1 wherein said clock recovery mechanism of said SDLC control circuit is a digital phase locked loop.

5. The circuit recited in claim 1 wherein said means for generating includes a timer circuit and a programmable peripheral interface circuit.

6. A method for providing communication between a processor and a remote terminal through modems by use of one of a plurality of communication protocols, comprising the steps of:

transmitting command signals through control lines from said processor to an asynchronous and bisynchronous control circuit for initialization thereof for operation in either an asynchronous or bisynchronous communication protocol;

transmitting command signals through control lines from said processor to an SDLC (Synchronous Data Line Control) control circuit for initialization thereof for operation in an SDLC communication protocol, said SDLC control circuit having a clock recovery mechanism for generating a data clock signal;

transmitting command signals through control lines from said processor to a clock selection circuit for setting a rate for data transfer through said asynchronous and bisynchronous control circuit or said SDLC control circuit;

applying said data clock signal from said SDLC control circuit to said clock selection circuit;

applying said data clock signal from said clock selection circuit to said asynchronous and bisynchronous control circuit during operation thereof under said bisynchronous protocol; and transferring data between said processor and said remote terminal through said modems and said asynchronous and bisynchronous control circuit at the data transfer rate selected by said processor.

7. The method recited in claim 6 including the steps of transferring data in a parallel format between said processor and said control circuits and transferring data in a serial format between said control circuits and said modems.

8. The method recited in claim 6 including the step of testing said control circuits by transferring the data on the transmit line from the control circuit selected by said processor to the receiver line for the selected control circuit.

* * * * *